(12) United States Patent
Visocekas et al.

(10) Patent No.: US 7,867,332 B2
(45) Date of Patent: Jan. 11, 2011

(54) METHOD OF PRODUCING A SOLID MINERAL MATERIAL

(75) Inventors: Fabrice Visocekas, Paris (FR); Francois Waendendries, Sissy (FR)

(73) Assignee: Minealithe, Sissy (FR)

( * ) Notice: Subject to any disclaimer, the term of this patent is extended or adjusted under 35 U.S.C. 154(b) by 727 days.

(21) Appl. No.: 11/813,688

(22) PCT Filed: Jan. 11, 2006

(86) PCT No.: PCT/FR2006/050015

§ 371 (c)(1),
(2), (4) Date: Jul. 11, 2007

(87) PCT Pub. No.: WO2006/075118

PCT Pub. Date: Jul. 20, 2006

(65) Prior Publication Data

US 2010/0031853 A1    Feb. 11, 2010

(30) Foreign Application Priority Data

Jan. 11, 2005    (FR) .................................. 05 50097

(51) Int. Cl.
C04B 12/04    (2006.01)
(52) U.S. Cl. ..................................................... 106/600

(58) Field of Classification Search ................ 106/772, 106/600

See application file for complete search history.

(56) References Cited

FOREIGN PATENT DOCUMENTS

| | | |
|---|---|---|
| DE | 3622568 | 1/1988 |
| DE | 19600977 | 7/1997 |
| DE | 10205728 | 8/2003 |
| EP | 0338093 | 10/1989 |
| EP | 0507368 | 10/1992 |
| JP | 09235147 | 9/1997 |
| JP | 2000129258 | 5/2005 |
| WO | 02/24597 | 3/2002 |
| WO | 03/078349 | 9/2003 |

OTHER PUBLICATIONS

International Search Report dated Jul. 25, 2006 from PCT/FR2006/050015.

*Primary Examiner*—Paul Marcantoni
(74) *Attorney, Agent, or Firm*—Young & Thompson

(57) ABSTRACT

The invention concerns a method for producing a solid inorganic material comprising a step a) during which at least three formulations are mixed together, said mixture comprising at least (i) silicon, (ii) aluminum and (ii) calcium and/or magnesium, followed by a step b) of forming the paste thus obtained into shape, then a step b) of drying at atmospheric pressure and at a temperature of under 99° C.

30 Claims, No Drawings

METHOD OF PRODUCING A SOLID MINERAL MATERIAL

FIELD OF THE INVENTION

The present invention concerns the field of producing solid inorganic materials the uses of which can be very varied, for example for making artistic objects, adornments or supporting structures in the field of architecture, or coatings or adhesives.

PRIOR ART

The creation of solid inorganic materials, particularly for producing architectural parts, has been implemented practically for many centuries, in particular for the construction of many edifices during the period of the Roman Empire, mainly based on hydrated or hydraulic lime.

It is only much more recently, during the $18^{th}$ century, that the control for producing solid inorganic materials was sought once again, this time in the light of the new knowledge of modern chemistry. This second period of design and production of solid inorganic materials resulted in the development of various cements obtained by heating to high temperatures a combination of natural minerals extracted from quarries, mainly limestone and clays. The stage of heating these combinations of natural minerals to high temperatures made it possible to prepare a cement material that reacted in contact with water, to form a solid inorganic material with good mechanical strength qualities.

The cement the most frequently used in the industry is the cement known as "Portland", which is a mixture of calcium silicate and calcium aluminate resulting from the combination of lime [CaO] with silica [$SiO_2$], alumina [$Al_2O_3$] and iron (III) oxide [$Fe_2O_3$].

Apart from a very few exceptions, the lime needed comes from carbonated rocks and alumina, silica and iron oxide comes from the clays. Practically, limestone and clay are extracted from quarries, then ground and homogenised before baking to a high temperature, at about 1450° C., to produce "clinker" which is then cooled, by quenching, for example, then ground in order to obtain ready mix cement. Clinker mainly comprises tricalcium silicate [$C_3S3CaO.SiO_2$], bicalcium silicate [$C_2S_2CaO.SiO_2$] and an interstitial phase formed of tricalcium aluminate [$C_3A3CaO.Al_2O_3$] and alumino-ferrite [$C_4AF$], sometimes partially vitreous, particularly in the case of energetic quenching causing rapid cooling.

In the state of the art, different routes have been researched for an alternative to cement for the manufacture of solid inorganic materials for various uses, particularly by developing methods that do not necessitate obligatory steps of heating to high temperatures.

In particular, production methods of solid inorganic materials have been described whereby alumino-silicate oxides are mixed in an aqueous solution of colloidal silica or alkaline polysilicate, with strong bases NaOH or KOH, as described particularly in the French patent application No. 2.659.319. Various alternatives or improvements of the method described in the French patent application No. 2.489.290 are described particularly in the PCT applications No. WO 82/00 816, No. WO 91/13.840, No. WO 92/04 298, No. WO 95/13.995, No. WO 96/28398 et No. WO 98/31644.

With the above methods it is possible to prepare in a satisfactory way solid inorganic materials that are free from binding additives of the cement type or other binder agent of the glue, gum, fatty acids or synthetic resin type. However, in practice, it has been shown that with some of these methods, obtaining a homogenous final solid inorganic material involves using a step of drying and hardening away from any exposure to atmospheric air, for example by immersion of the intermediate product formed in a liquid such as water.

Mention can also be made of materials described in the Japanese patent application No. JP 2000129258, obtained by mixing incinerated industrial effluents containing CaO and alkaline salts with a cement and/or gypsum, or those described in the Japanese patent application No. JP 09235147, obtained by mixing ashes containing CaO and $CaSO_4$ with a source of lime, silica and/or gypsum.

Many other studies have been done in the state of the art with a view to producing solid inorganic materials, using a large variety of starting products.

U.S. Pat. No. 4,642,137 describes a formulation of a binder for Portland cement comprised of a mixture of slag, schist or calcined clay, amorphous silica, a dissolved potassium silicate and a potassium hydroxide.

European patent No. EP 452 913 describes a formulation directed to the construction of roads comprising a mixture of silicate with a carbonated rock and an alkalinity regulator.

The German patent application No. DE 196 00977 describes a paste-like foam comprising the mixture of a silicate, a hardening agent, which is an alkaline preparation, and a foaming agent which is an acid/base combination.

The German patent application No. DE 23 56524 describes a binder for the production of a basaltic solid inorganic material, using a dissolved alkaline silicate and a phosphate or a borate.

The extreme diversity of combinations of products and methods described in prior art with a view to producing solid inorganic materials illustrate the essentially empirical character of their development, and so also the very narrow and time limited character of there teaching for the man skilled in the art.

DESCRIPTION OF THE INVENTION

The applicant has sought to develop a production method of a solid inorganic material which is an alternative or an improvement to known methods.

In particular, the applicant has tried to develop a method for producing solid inorganic materials which can be formed by any type among known techniques, such as casting, moulding, modelling, ramming, injection and also formwork, before the hardening step.

In particular, the applicant has sought to develop a production method of a solid inorganic material for which the hardening step can be carried out at atmospheric pressure and at ambient temperature or by moderate heating.

Also, the applicant has sought to develop a unique method which will make it possible to produce solid inorganic materials of various formulations, and thus of very different mechanical characteristic and aesthetic appearances, according to the use or application which is sought for the final solid object.

After much research, the applicant has developed a new method for preparing an inorganic hydraulic binder comprising at least (i) silicon, (ii) aluminium and (iii) calcium and/or magnesium.

The object of present invention is a method for producing a solid inorganic material comprising the following steps:
  a) an aqueous paste is produced according to the following steps:
    a1) a paste formulation is provided by reaction of (i) a powder of one or more materials comprising a compound or a combination of compounds of silicon present in the form of anhydrous silica ($SiO_2$) or hydrated silica ($Si(OH)_4$), with (ii) an inorganic base or a combination of inorganic bases, optionally with (iii) water added;

a2) one of the following steps a2-1 or a2-2) is carried out:

a2-1) a formulation is provided consisting of a compound or a combination of compounds selected from among (i) sulphuric acid, (ii) a sulphuric acid salt selected from among alkaline sulphates, alkaline earth sulphates, metal sulphates or mixed sulphates, (iii) an organic acid and (iv) an organic acid salt; or a2-2) a liquid or paste formulation is obtained by mixing:

a compound or a combination of compounds selected from among (i) sulphuric acid, (ii) a sulphuric acid salt selected from among alkaline sulphates, alkaline earth sulphates, metal sulphates or mixed sulphates, (iii) an organic acid and (iv) an organic acid salt;

at least one inorganic or organic base; and if necessary, water;

a3) a formulation is provided comprising: an additional crystalline or amorphous mineral or a combination of additional crystalline or amorphous minerals selected from among silicates, aluminates and carbonates, such that the combination of compounds or formulations supplied in steps a1) to a3) comprise at least (i) silicon, in the form of anhydrous silica, (ii) aluminium and (iii) calcium and/or magnesium, said formulation optionally comprising water;

a4) a paste is produced by mixing the formulations from steps a1), a2 and a3).

b) the paste obtained from step a) is formed into shape; and c) the aqueous paste shaped in step b) is hardened by drying at atmospheric pressure, and at a temperature of less than 99° C., until the solid inorganic material is obtained.

The term alkaline element, in the sulphates, and thiosalts, as used according to the invention, is understood to mean an element selected from among lithium (Li), sodium (Na) and potassium (K).

The term alkaline earth element, in the sulphates, as used according to the invention, is understood to mean an element selected from among calcium (Ca), magnesium (Mg) and beryllium (Be).

The term metallic element, in the sulphates, as used according to the invention, is understood to mean an element selected from among the first fourteen columns in the Periodic Table of Elements other than Li, Na, K, Ca, Mg and Be. Preferably according to the invention, a metal element is an element selected from among aluminium (Al), silver (Ag), copper (Cu), iron (Fe), tin (Sn), nickel (Ni), gold (Au), platinum (Pt), lead (Pb), titanium (Ti), manganese (Mn), chrome (Cr), cobalt (Co) molybdenum (Mo), zinc (Zn), zirconium (Zn), cadmium (Cd) and mercury (Hg).

In general, step a) of the above method is carried out without heat from an external source being applied. Step a) is generally carried out at room temperature, that is at a temperature ranging from 15° C. to 35° C., and preferably from 19° C. to 30° C.

Without wanting to be limited to any theory, the applicant thinks that at step a) of the above method, the combination of (i) certain ions, for example sodium or potassium or lithium ions that may be present, (ii) sulphate and/or carboxylic ions, and (iii) minerals comprising silicon, aluminium, calcium and/or magnesium, in the presence of water, is essential for obtaining a solid final product in which these various components are found in agglomerated form, said final solid product having the appearance of natural rock.

One of the essential components used according to the method is the paste formulation provided in step a1); which comprises the combination (i) of a source of silicon and (ii) of a inorganic base. The formulation of the paste provided at step 1) keeps a homogenous texture, even after dehydration caused by a long period of storage, for example in air; thus said paste, when drying, does not lead to the exclusive formation of a granular solid. The formulation of the paste provided at step a1) has the advantage of being able to be prepared in large quantities, then stored for a long period, for example several months at ambient temperature, before use. If necessary, after several months' storage, the paste formulation provided in step a1) can be rehydrated before being used to implement the method, with an appropriate quantity of water in order to obtain the required degree of viscosity.

Another essential component used according to the method is the formulation which results from combining or mixing the paste formulation provided in step a1) with the formulation provided in step a2).

According to a preferred embodiment of the method of the invention, in order to prepare the formulation provided in step a1), one or more of the materials comprising hydrated silica [$Si(OH)_4$] are used, with which the best results are obtained.

As materials comprising a compound or a combination of compounds of silicon of the hydrated silica type [$Si(OH)_4$], materials comprised of opal or chalcedony are preferably used. Preferably, materials selected from among diatomite, radiolarite, opal, gaize, flint, millstone grit, jasper, agate, chert, lutecite, chalcedonite, quartzine, petrified wood, and chalcedony are used. These materials are preferably used in the form of a powder, which is combined in step a1) with at least one inorganic base.

The inorganic base is preferably selected from among a sodium hydroxide, a potassium hydroxide, a lithium hydroxide, sodium carbonate ($Na_2CO_3$; $Na_2CO_3.10H_2O$) potassium carbonate ($K_2CO_3$) and lithium carbonate ($Li_2CO_3$).

Most preferably, the inorganic base is selected from among a sodium hydroxide, a potassium hydroxide and a lithium hydroxide.

In order to prepare the paste formulation provided in step a1) with a material comprising hydrated silica [$Si(OH)_4$], the powder of the material or materials comprising hydrated silica is put in contact with the inorganic base or bases, at atmospheric pressure, and at a temperature ranging from 20° C. to 120° C. preferably at a temperature ranging from 50° C. to 120° C., in the presence of water. In this particular embodiment, bases selected from among NaOH, KOH, LiOH are preferably used. The inorganic base or bases are generally used in liquid form. Water is added to the mixture, in quantities determined by those skilled in the art, by simple routine tests. The solid powder and the liquid or liquids are mixed until a paste formulation is obtained with a homogenous appearance and a variable consistency depending on the quantities of liquid added. The paste formulation provided in step a1) can be of liquid or semi-liquid consistency, or can have the consistency of a firm paste. The paste formulation provided in step a1) comprises, as well as the silicon provided by the hydrated silica and the alkaline components provided by the inorganic base or bases, many other chemical species derived from the starting materials used to prepare the formulation. Thus, the formulation provided in step a1) consists of a liquid or paste-like mineralogical material which may be of a complex chemical formulation.

In other embodiments of the method of the invention, in order to prepare the formulation provided in step a1), one or more of materials comprising hydrated silica [$SiO_2$] are used. According to these other embodiments, the paste formulation provided in step a1) is prepared by putting the powder of the material or materials comprising hydrated silica in contact with the inorganic base or bases, at a pressure above atmospheric pressure, and at a temperature of over 120° C. By way of illustration, one such formulation provided at step a1) can be obtained by melting the anhydrous silica and a carbonate selected from among $Na_2CO_3$, $K_2CO_3$ and $Li_2CO_3$, at a high temperature, preferably at a temperature ranging from 600° C. to 1300° C. At 1300° C., a glass is obtained that is then liquefied in an autoclave, for example at a temperature of at least 150° C., preferably from 180° C. to 200° C., and at a pressure of $10^5$ to $3.10^5$ Pa generally for a period of several hours, depending on the quantities. Also by way of illustration, at 800° C., the product obtained is ground, then mixed with liquid water at a temperature below 120° C., the evaporation temperature of water, for a duration ranging from a few minutes to a few hours. This liquid consists of silica dissolved in an alkaline medium. In certain embodiments, the resulting liquid is used directly as the formulation of step a1), to carry out the method of the invention. In other embodiments, the resulting liquid is first filtered in order to eliminate the solid particles that it may contain. The liquid filtrate is then used as the formulation of step a1), to carry out the method of the invention.

In general, sulphur-based or organic acid-based compounds used in step a2) of the method consist in sources of acid ions that are provided to the final formulation of the inorganic aqueous paste that is obtained in step a4). Thus, depending on the type of compound used, acid sulphate ions [$SO_4^{2-}$] or organic acid ions, which are mainly carboxylic [$COO^-$] are provided to the aqueous paste.

The sulphate ions can be provided, at step a2) by the presence of sulphuric acid or else by the presence of alkaline sulphate salts such as sodium sulphate [$Na_2SO_4$], alkaline earth sulphate salts such as gypsum [$CaSO_4, 2H_2O$] and baryte [$BaSO_4$], or else metal sulphate salts such as copper sulphate [$CUSO_4$], or alunite.

The organic acid ions may be provided, at step a2), by the presence of an organic acid or the salt of an organic acid comprising one or several carboxyl groups [$COO^-$].

Depending on their nature, the compounds that are sources of acid ions used in step a2) are in liquid form or solid form, preferably in powder form, as those skilled in the art can determine from their general technical knowledge. By way of illustration, sulphuric acid is used in liquid form. An organic acid salt, such as potassium tartrate for example, can be used in solid powder form or else in dissolved form in aqueous solution. A source of sulphate ions such as a calcium sulphate, or an inorganic compound comprising calcium sulphate such as gypsum, is used in powder form, for example a gypsum powder. The term "compound" as used to define the characteristics of step a2) of the method, is understood to include an inorganic material that is a source of acid ions, such as gypsum.

The term "powder", according to the invention is understood to mean a solid material in the form of particles. A powder according to the invention can be characterised, particularly, by its particle size.

The term "particle size" of a powder used in the method of the invention, is understood to mean the size of the particle such that, in a sample of the said powder, there is as great a weight of particles with a size inferior to the "particle size" as weight of particles with a size greater than the "particle size".

The particle size according to the invention can be easily verified by those skilled in the art, for example using sieving techniques with a series of sieves with a mesh size calibrated smaller and smaller. These techniques are perfectly conventional for measuring the particle size of inorganic solids, particularly the particle size of rock sample, including sand and gravel. Sieves are available commercially with very varied mesh size, for example sieves with a mesh size of 0.001 mm through to sieves with a mesh size of several centimeters.

In order to implement the method of the invention, powders are used with particle sizes that can vary greatly, particularly depending on the appearance required for the final object. In general, the size of powder particles of the various materials used in the method can vary, depending on the material and the type of aqueous paste that is required, within a range of from 1 μm to 10 cm, including from 10 μm to 1 cm.

According to a first embodiment of step a2), which is called a2-1) in the present specification, this step is provided with a formulation comprising exclusively of a compound or a combination of compounds providing acid ions.

According to a second embodiment of step a2), which is called a2-2) in the present specification, this step is provided with a formulation obtained by mixing a compound or a combination of compounds providing acid ions and at least one inorganic or organic base. At step a2-2), the inorganic base or bases may be selected from among a sodium hydroxide, a potassium hydroxide, a lithium hydroxide, sodium carbonate ($Na_2CO_3$; $Na_2CO_3.10H_2O$), potassium carbonate ($K_2CO_3$) and lithium carbonate ($Li_2CO_3$). The organic base can be ammonium [$NH_4^+$].

At step a2), that is to say either at step a2-1), or at step a2-2), one can also add to the formulation that is provided, one or several additional inorganic acid compounds, for example inorganic compounds comprising phosphate [$PO4^{3-}$], nitrate [$NO_3^-$], fluoride [$F^-$] and chloride [$Cl^-$] radicals, particularly salts formed with these ions, such as apatite $Ca_5(PO_4)_3(OH, F, Cl)$, saltpetre $KNO_3$, fluorspar $CaF_2$ and common salt NaCl.

The additional inorganic acid compounds can be selected from among hydrofluoric acid [HF], hydrochloric acid [HCl], phosphoric acid [$H_3PO_4$] and nitric acid [$HNO_3$].

At step a3), a formulation is provided comprising a mineral or a combination of minerals, the mineral or minerals being selected in such a way that the paste obtained at the end of step a4), which results from the combination of compounds or formulations provided in steps a1) to a3), comprises at least (i) silicon, in the form of anhydrous silica, (ii) aluminium and (iii) calcium and/or magnesium.

In many embodiments of the method of the invention, the formulation provided in step a3) contains water.

As will be explained in detail in the description which follows, the formulation provided at step a3) can comprise one or several additional compounds or materials, other than silicates, aluminates and carbonates.

At step a3), for example, depending on the embodiments of steps a1) and a2), the following crystalline or amorphous inorganic materials selected from among silicates, aluminates and carbonates can be used, singly or in combination:

silicates composed of pure silica, such as quartz, cristobalite, trymidite, stishovite or amorphous silica, aluminosilicates, including (i) natural clays and baked clays belonging to the group kaolinite, illite, smectite, vermiculite, and also metakaolin, terracotta, (ii) feldspars such as potassium feldspar (orthoclase) or plagioclase feldspar, (iii) micas such as muscovite, (iv) volcanic glasses such as andesite, basalt and pozzolana, or again (v) schists such as slate, (vi) zeolites, (vii) garnets and (viii) certain amphiboles, alkaline earth silicates such as talc, serpentine, asbestos, wollastonite, pyroxenes, olivine, and certain amphiboles;

aluminates such as gibbsite, alumina and diaspora, alkaline or alkaline earth carbonates such as calcite, dolomite, magnesite and natron; and metallic carbonates such as malachite and rhodochrosite.

The mineral or combination of minerals provided in step a3) is generally presented in powder form with a particle size that varies from 1 µm to 10 cm, preferably from 10 µm to 5 mm, and more preferably from 10 µm to 1 mm. A powder with a particle size that varies from 1 µm to 1 mm is used when working with a mineral obtained by mechanical grinding starting from rock. A powder with a particle size of the order of 1 cm is used when working with a coarse powdered mineral resulting from the natural disintegration of rock.

It is to be understood that at step a3) a combination of minerals can be provided in which each mineral has a specific particle size, different from the particle size of at least one other mineral of said combination. The result is that the formulation provided in step a3) can be comprised of particles with a very heterogeneous size distribution.

The formulation provided at step 3) can, in some embodiments, also comprise of an inorganic or organic base, or a combination of inorganic and/or organic bases.

Surprisingly, it has been shown according to the invention that by combining at least the formulations provided in steps a1), a2) and a3), a solid inorganic material is obtained by proceeding to a simple hardening step by drying at atmospheric pressure, in a confined medium or in contact with air.

Just as surprisingly, it has been shown that the minimal combination carried out at step a4) above made it possible to create an aqueous inorganic paste, with a varied consistency depending on the proportion of liquid contained in the paste, to which an additional inorganic compound or combination of inorganic compounds can be added which can give to the final product varied and controllable mechanical strength characteristics or aesthetic characteristics.

Moreover, thanks to the method described above, a solid inorganic material can be obtained without adding to the formulations provided in steps a1) to a3) any supplementary binding additive from among those currently used in prior methods for producing solid inorganic materials sometimes called "artificial stone". Thus, at step a) of the method, the paste produced in step a4) can be free from any binding additive, particularly from any binding additive of the cement type, including Portland cement, and from any binding additive of the fatty acid or resin type. Particularly, in step a4) of the method, the paste obtained can be free from any animal- or plant oil-based resin, particularly from resin oil such as rosin, pine resin, daunmara resin, kauri gum, amber resin or copal oil. In the same way, the paste obtained in step a4) of the method can be free from any binding resin consisting of a solid or liquid fatty matter, particularly fatty acids or glycerides such as olein, stearin or linolein. Also, the paste obtained in step a4) can be free from resin based on one or several synthetic polymers or copolymers, particularly silicone, polyester, polyacrylate, polymethacrylate, polymethylmethacrylate or any other synthetic polymer or copolymers, particularly crosslinkable polymers or copolymers.

As illustrated in the examples, and whatever the embodiment of the method that was carried out, the step c) of hardening is usually carried out at a temperature of under 70° C. In many cases, the inorganic aqueous paste which was previously shaped in step b) can be hardened in step c) by drying at ambient temperature, or by very moderate heating at a temperature of under 40° C., as illustrated in the examples.

Depending on the combination of formulations used at the beginning of step a4) and/or their relative proportions in the mixture and the total quantity of water used for preparing the final aqueous paste, those skilled in the art determine, by simple routine tests, which are the optimal conditions for hardening in step c), particularly the temperature conditions for hardening. For a given aqueous paste produced in step a), those skilled in the art can vary the conditions of temperature, within the limits indicated above, and the conditions of duration, by simple routine tests. Thus, if rapid hardening of the aqueous paste is sought, step c) hardening can be carried out at a temperature above the temperature which is applied when step c) is carried out without a time constraint. In the same way, the duration of hardening can vary depending on the total quantity of water provided in steps a1) and a2) to produce the final aqueous paste.

In general, for 100 parts by weight of the final aqueous paste obtained at step a4), said aqueous paste contains a quantity of water ranging from 5 to 50 parts by weight, and most frequently from 5 to 30 parts by weight. In most cases, for 100 parts by weight of final aqueous paste, said aqueous paste contains a quantity of water ranging from 10 to 30 parts by weight.

The quantities of the formulations provided at steps a1), a2) and a3) can be very varied, as is illustrated in the examples and can nevertheless make it possible to produce a solid inorganic material.

However, preferably, the quantity of the formulation provided in step a2) is not less than 0.5 parts by weight, and more preferably is not less than 5 parts by weight, for 100 parts by weight of the final aqueous paste obtained in step a4).

Preferably, the quantity of the formulation provided in step a3) is not less than 0.5 parts by weight, and more preferably is not less than 5 parts by weight, for 100 parts by weight of the final aqueous paste obtained in step a4).

Preferably, the quantity of the formulation provided in step a1) is not less than 0.5 parts by weight, and more preferably is not less than 5 parts by weight, for 100 parts by weight of the final aqueous paste obtained in step a4).

In certain embodiments of step a4) of the method, (a) the formulations provided in steps a1) and a3) are mixed first, then (b) either (i) the formulation provided at step a2-1, or (ii) the formulation provided at step a2-2) is added.

In yet other embodiments of step a4) of the method, all or part of the inorganic substances provided at step a3) are mixed separately with the formulations provided in steps a1) and a2), then the two respective mixtures are added together at the end of step a4).

In still other embodiments of the method, the formulations provided in steps a1) and a2) are mixed first, then the formulation provided at step a3) is added in a second step.

In general, for the temperatures indicated above, step c) of hardening can be carried out for a duration of 2 minutes to 100 hours, in order to obtain the final product in the solid state.

In order to obtain a solid inorganic object with mechanical strength characteristics that do not alter with time, step c) of hardening can be followed by a step d) of curing or final consolidation the duration of which can be up to several weeks, for example 5 to 6 weeks. In general, step d) of curing or final consolidation is carried out at ambient or moderate temperature, for example at a temperature varying from 20° C. to 60° C.

According to the method of the invention, step c) of hardening does not require any protection of the object shaped in step b), to protect it from contact with air.

Thus, according to a first aspect, step c) of hardening is carried out in contact with the air in the atmosphere. According to this aspect, step c) of hardening can carried out in contact with the air in the atmosphere at ambient temperature. According to this same aspect, when step c) of hardening is carried out at a temperature above ambient temperature, step c) of hardening can be carried out within an oven or kiln. In particular, the applicant observed that a varnish could be formed, preferably on the face or faces of the object which had hardened or on the face or faces of the hardened object which were directly in contact with the air, when carrying out step c) of hardening.

According to another aspect, step c) of hardening can be carried out in a confined atmosphere at ambient temperature, without a circulation of air coming from the outside atmosphere including by total immersion of the shaped paste in water.

According to the type of final object that is required, step c) of hardening, which is optionally followed by step d) of curing or final consolidation, can be followed by a step e) of baking the solid inorganic object. The baking step is preferably carried out at a temperature of over 1500° C. The optional baking step consists of step e) of the method, whether this method comprises or does not comprise the optional prior step d) of curing or final consolidation.

Step e) of baking can be carried out in the chamber of an oven equipped with air vents, which can be open or closed.

In general, step e) of baking after hardening, and optionally after curing or final consolidation is included, in order to obtain a surface vitrification of the hardened object, this vitrification resembling an enamel or a glass, particularly for producing tiling, jewelry, decorative objects, bathroom items, etc.

As an illustration, in step a), the weight ratio of the formulation provided at step a1) compared with the total weight of materials provided at step a2) and a3) can vary from 1/10 to 1/0.1.

As already described, the weight ratios of the different formulations provided in steps a1), a2 and a3), in order to form the aqueous paste produced in step a4) of the method, can vary considerably depending on the type of solid inorganic material for which production is envisaged. In order to determine the proportions of the various compounds used to produce the aqueous paste, at step a4) of the method, those skilled in the art can, by simple routine tests, determine the optimal proportions of these compounds, depending on the goal to be achieved, with the help of the many embodiments of the method of the invention which are illustrated in the examples.

Various other aspects of the invention method are described below.

In certain embodiments of the method, the method is characterised in that at step a1), or at step a3), the material or materials comprising a compound or combination of compounds of silicon of the anhydrous silica type ($SiO_2$) are selected from among quartz, trymidite, cristoballite, stishovite, or amorphous silica.

In certain embodiments of the method, the method is characterised in that the quartz is selected from among rock crystal, amethyst, rose quartz, smoky quartz, citrin quartz, milky quartz, prasiolite, aventurine, and fibrous quartz.

In certain embodiments of the method, the method is characterised in that the material or materials comprising a compound or combination of compounds of silicon of the anhydrous silica type ($SiO_2$) are selected from among amorphous silicate, particularly amorphous silicate of volcanic origin, comprising over 20% in moles of $SiO_2$, compared with the total number of moles of said silicate.

In certain embodiments of the method, the method is characterised in that the material or materials containing a compound or combination of compounds of silicon of the anhydrous silica type ($SiO_2$) are selected from among kaolinite $Al_2Si_2O_5(OH)_4$, metakaolin $2SiO_2Al_2O_3$, prenhite $Ca_2(Al)[AlSi_3O_{10}](OH)_2$, illite $KAl_4[Si_7AlO_{20}](OH)_4$, smectite $(½Ca,Na)_{0.7}(Al_4[(Si,Al)_8O_{20}]$ $(OH)_4.nH_2O$, vermiculite $(Mg,Ca)_{0.6}Al_6[(SiAl)_8O_{20}](OH)_4.nH_2O$, andalusite $Al_2SiO_5$, apophyllite $KCa_4F(Si_4O_{10})_28H_2O]$, beryl $Al_2Be_3Si_6O_{18}$, chrysocolla $CuSiO_3.nH_2O$, dioptase $CuSiO_2(OH)_2$, cyanite $Al_2SiO_5$, mullite $Al_4Si_2O_{10}$, olivine $(MgFe)_2(SiO_4)$, serpentine $Mg_6Si_4O_{10}(OH)_8$, titanite $CaTiSiO_5$, steatite $Mg_3(OH)_2Si_4O_{10}$, zircon $ZrSiO_4$, wollastonite $CaSiO_3$, and talc $Mg_3Si_4O_{10}.(OH)_2$.

In certain embodiments of the method, the method is characterised in that the material or materials comprising a compound or combination of compounds of silicon of the anhydrous silica type ($SiO_2$) consist of a feldspar selected from among orthoclase feldspars $KAlSi_3O_8$ including orthoclase, microcline and sanidine, plagioclase feldspars including albite $NaAlSi_3O_8$ and anorthite $CaAl_2Si_2O_8$.

In certain embodiments of the method, the method is characterised in that the material or materials comprising a compound or combination of compounds of silicon of the anhydrous silica type ($SiO_2$) consist of a feldsparoid including nepheline $(Na_3,K)AlSiO_4$, kalsilite $SiAlO_4K$, cancrinite or vishnevite $(Na,Ca,K)_{6-8}[Si_6Al_6O_{24}][(SO_4,CO_3,Cl,OH]_{1-2}.nH_2O$, leucite $KAlSi_2O_6$, analcite $NaAlSi_2O_6.H_2O$, sodalite $Na_8Si_6Al_6O_{24}Cl_2$, hauinite $(Na,Ca)_{4-8}[Si_6Al_6O_{24}](SO_4)_{1-2}$, lazurite $(Na,Ca)_{4-8}[Si_6Al_6O_{24}](SO_4,S)$ and noseane $Na_8[Si_6Al_6O_{24}](SO_4)$.

In certain embodiments of the method, the method is characterised in that the material or materials comprising a compound or combination of compounds of silicon of the anhydrous silica type ($SiO_2$) consist of a pyroxene selected from among an orthopyroxene including enstatite $MgSiO_3$, aegirine $NaFeSi_2O_6$, pigeonite $(Mg,Fe,Ca)$ $(Mg,Fe)Si_2O_6$ and ferrosilite $FeSiO_3$, a clinopyroxene including diopside $CaMgSi_2O_6$, augite $(Ca,Fe,Mg)(Si,Al)_2O_6$, jadeite $NaAlSi_2O_6$ and a spodumene $LiAlSi_6O_6$.

In certain embodiments of the method, the method is characterised in that the material or materials comprising a compound or combination of compounds of silicon of the anhydrous silica type ($SiO_2$) consist of a mica such as biotite $K(Fe,Mg)_3AlSi_3O_{10}(OH,F)_2$, muscovite $KAl_2(AlSi_3O_{10})(OH,F)_2$, bromomuscovite $KAl_2BSi_3O_{10}(OH,F)_2$, hydrobiotite $K(Mg,Fe)_9(Si,Al)_8O_{20}(OH)_4.nH_2O$, phlogopite $KMg_3(AlSi_3O_{10})$ $(F,OH)_2$, lepidolite $KLi_2Al(OH,F)_2AlSi_3O_{10}$, zinnwaldite $KLiFeAl(OH,F)_2$, glauconite $(K,Ca,Na)_{1.6}(Fe,Al,Mg)_4Si_{7.3}Al_{0.7}O_{20}(OH)_4$ and paragonite $Na_2Al_4$ $[Si_6Al_2O_{20}](OH)_4$.

In certain embodiments of the method, the method is characterised in that the material or materials comprising a compound or combination of compounds of silicon of the anhydrous silica type ($SiO_2$) consist of a garnet, such as a garnet selected from almandine $Fe_3Al_2(SiO_4)_3$, andradite $Ca_3Fe_2(SiO_4)_3$, grossular garnet $Ca_3Al_2(SiO_4)_3$, pyrope garnet $Mg_3Al_2(SiO_4)_3$, spessartine garnet $Mn_3Al_2(SiO_4)_3$ and ouvarovite garnet $Ca_3Cr_2(SiO_4)_3$.

In certain embodiments of the method, the method is characterised in that the material or materials comprising a compound or combination of compounds of silicon of the anhydrous silica type ($SiO_2$) consist of a scapolite $(Na,Ca,K)_4[Al_3(Al,Si)_3Si_6O_{24}](Cl,CO_3,SO_4)$.

In certain embodiments of the method, the method is characterised in that the material or materials comprising a compound or combination of compounds of silicon of the anhydrous silica type ($SiO_2$) consist of a zeolite $(Na_2,K_2,Ca,Ba)[(Al,Si)O_2]_n \cdot xH_2O$.

In certain embodiments of the method, the method is characterised in that the material or materials comprising a compound or combination of compounds of silicon used in step a1), and optionally also in step a3), are present in the form of silica extracted from a plant such as horsetail (*Equisetum arwense*), bracken, rice straw, reed, papyrus and cereal plants such as wheat and barley.

Preferably, in step a1), the mineral base is selected from among a sodium hydroxide, a potassium hydroxide, a lithium hydroxide, sodium carbonate ($Na_2CO_3$ or $Na_2CO_3 \cdot 10H_2O$), potassium carbonate $K_2CO_3$ and lithium carbonate $Li_2CO_3$.

Preferably, in step a2) the sulphuric acid salt consists of a gypsum [$CaSO_4 \cdot 2H_2O$].

Preferably, in step a2), for the organic acid or the organic acid salt, said organic acid consists of a carboxylic acid selected from among alkylcarboxylic acids with 2 to 20 carbon atoms and arylcarboxylic acids with 6 to 20 carbon atoms.

Preferably, the alkylcarboxylic acids and arylcarboxylic acids are selected from among acetic acid [$CH_3COOH$], benzoic acid [$C_6H_5COOH$], butanoic acid [$CH_3CH_2CH_2COOH$], chloroacetic acid [$ClCH_2COOH$], citric acid [$HOOCC(OH)(CH_2COOH)_2$], formic acid [$HCOOH$], fumaric acid [trans-$HOOCCH$—$CHCOOH$], glycolic acid [$HOCH_2COOH$], lactic acid [$CH_3CH(OH)COOH$], maleic acid [cis-$HOOCCH$—$CHCOOH$], malic acid [$HOOCCH(OH)CH_2COOH$], malonic acid [$HOOCCH_2COOH$], mandelic acid [$C_6H_5CH5OH)COOH$], o-phthalic acid [o-$C_6H_4(COOH)_2$], oxalic acid [$HOOC$-$COOH$], propanoic acid [$CH_3CH_2COOH$], pyruvic acid [$CH_3COCOOH$], salicylic acid [o-$C_6H_4(OH)COOH$], succinic acid [$HOOCCH_2CH_2COOH$], tartaric acid [$HOOCCH(OH)CH(OH)COOH$], trichloroacetic acid [$CCl_3COOH$].

Preferably, an organic acid salt can be selected from among the salts of acids described above including potassium and sodium salts. Included in salts of organic acids according to the invention, are sodium bicarbonate, potassium bicarbonate and potassium bitartrate.

If a final coloured object is desired, for example a coloured ceramic object after baking at a high temperature, different metallic chemical species, such as Fe, Cu, Co, Mn, Cr, Zn, Ti, Pb, Ag or Au can be added at step a), generally at step a3). Said metallic chemical species can be added in the form of metal flakes, of pure metal oxides or in the form of minerals containing them, such as silicates, carbonates, aluminates, sulphates or metal salts, eventually in the form dissolved in a liquid. In these embodiments of the method, high temperature baking is carried out at step e), for example at a temperature above 700° C. for several hours. In other embodiments of the method, a certain quantity of zinc is added at step a), generally by adding to the formulation provided at step a3), in order to increase the agglomeration properties of the final paste obtained at step a4), and to increase the mechanical strength characteristics of the solid final product inorganic material of the method, including the strength of the final solid inorganic material as far as contact with water or an aqueous solution is concerned. The zinc can be added by adding zinc oxide [ZnO], in a quantity in weight that can be easily determined by those skilled in the art, with the help of simple routine tests. For example, at step a) a quantity of zinc oxide can be added ranging from 0.1% to 10% by weight, compared with the total weight of the final paste obtained at the end of step a4).

Other particular embodiments of the method of the invention are illustrated in the examples.

Another object of the present invention is an aqueous inorganic paste for producing a solid inorganic material characterised in that it consists of a mixture comprising:

a) a paste formulation obtained by reaction of (i) a powder of one or more materials comprising a compound or a combination of compounds of silicon present in the form of anhydrous silica ($SiO_2$) or hydrated silica ($Si(OH)_4$), with (ii) an inorganic base or a combination of inorganic bases, optionally with (iii) water added;

b) a formulation selected from among:

b1) a formulation consisting of a compound or a combination of compounds selected from among (i) sulphuric acid, (ii) a sulphuric acid salt selected from among alkaline sulphates, alkaline earth sulphates, metal sulphates or mixed sulphates, (iii) an organic acid and (iv) an organic acid salt; or b2) a liquid or paste formulation obtained by mixing:

a compound or a combination of compounds selected from among (i) sulphuric acid, (ii) a sulphuric acid salt selected from among alkaline sulphates, alkaline earth sulphates, metal sulphates or mixed sulphates, (iii) an organic acid and (iv) an organic acid salt;

at least one mineral or organic base; and if necessary, water; and c) a formulation comprising of an additional crystalline or amorphous mineral or a combination of additional crystalline or amorphous minerals selected from among silicates, aluminates and carbonates, in such a way that the final aqueous inorganic paste comprises at least (i) silicon, (ii) aluminium and (iii) calcium and/or magnesium, said formulation optionally comprising water.

The aqueous inorganic paste is obtained by manual or mechanical mixing.

Depending on the total quantity of liquid incorporated at step a) of the method, an aqueous inorganic paste is obtained with a firm, semi-firm or normal consistency, that is, in the latter case a consistency similar to that of potter's clay. For larger volumes of liquid added at step a) of the method, a semi-liquid or liquid aqueous inorganic paste is obtained.

The choice of the fluidity of the aqueous inorganic paste depends on the type of shaping step carried out at step b) of the method, the mechanical strength characteristics sought for the final solid inorganic material, its porosity or the surface finish desired.

The fluidity of the aqueous inorganic paste prepared at step a) of the method depends on the proportion of mixing water used, the size, shape and function of the grains of solid matter put into the paste, the nature of the substances in solution and the proportion of compounds added which, on dissolving in water, will modify the plasticity of the paste.

In general, the proportion of mixing water used in step a) of the method is determined by those skilled in the art, by simple routine tests, in order to obtain the shrinkage characteristics of the moulded paste or the dilatation characteristics on heating which are adapted to the final use that is envisaged. In certain cases, it is preferable to use warm water, with a temperature of under 99° C.

As already mentioned previously in the present specification, step b) of shaping can be of any known type. The nature of step b) of shaping depends essentially on the type of object that is to be produced. Thus, step b) for shaping the aqueous inorganic paste can consist of casting the paste in a mould, including a porous mould such as plaster or baked clay. Likewise, step b) can consist in a step of casting the aqueous inorganic paste in a semi-liquid form, using conventional techniques used for producing concrete objects made of flooring in casing or between form panels, reinforced or not, vibrated or not vibrated. Equally, step b) for shaping can consist in a step of tamping into a hard mould, such as a mould made of metal, greased plaster, wood, stone, etc. Step b) for shaping can also consist of a step of tamping into a flexible mould, such as an elastomer mould, a silicon mould or a plastic mould.

In general, after casting the aqueous inorganic paste in formwork or a mould, the paste is tamped down according to conventional techniques, either manually, or by hitting with a hammer or by vibration.

By way of illustration, the aqueous inorganic paste, once introduced into the mould, can be vibrated according to different techniques, such as on a vibrating plate, using a vibrating poker incorporated into the mass of the paste or by using a rotary mixer device.

By way of illustration, the aforesaid moulding and vibrating techniques can by used to produce solid inorganic materials directed to being sculpted or to be used as tamped building materials, in a factory or on a building site, that is on the production site of the solid inorganic material.

Also in step b) of the method, the aqueous inorganic paste, for example in semi-liquid form, can be tamped or vibrated on a substrate onto which the paste will adhere. Such a technique can be used particularly for producing solid inorganic materials such as slabs. The slabs can then be applied to walls in order to give an attractive finish to the fagade of a building. The aqueous inorganic paste can also be used to produce solid materials which can be inlaid in the surface or in the mass of an object made of metal, wood, stone, plastic etc.

According to another alternative, the aqueous inorganic paste, when present in a form that is not very fluid, can be shaped, at step b) of the method, by turning, using a conventional technique used in pottery for shaping clay, for example when producing decorative objects such as vases.

According to another alternative, the aqueous inorganic paste can be modelled, for example for producing objects in the field of sculpture.

According to a further alternative, the aqueous inorganic paste can be used for filling or repairing defects or accidents, for example cracks or holes, in the field of restoring buildings or restoring ancient objects made totally or partly of stone.

According to another alternative, the aqueous inorganic paste can also be used as a finish, a casting cement or as an inorganic adhesive.

According to another aspect, the aqueous inorganic paste can be used to produce moulds in solid inorganic material.

Also, the aqueous inorganic paste can be shaped by ramming, for example for producing slabs, breeze-blocks and bricks in solid inorganic material, to be used in the inner or outer parts of buildings.

According to another technique, the aqueous inorganic paste, for example when it is present in the form of a semi-hard paste, can be tamped, then sculpted before step c) of hardening.

Also, the aqueous inorganic paste can be worked in order to obtain the surface appearance desired, for example an attractive matt surface. The object can be polished.

According to another aspect, the final object made of solid inorganic material can be shaped, at step b) of the method, by injecting the aqueous inorganic paste according to conventional techniques, for example by injection in a vacuum or by injection at atmospheric pressure, or by injection at high pressure.

According to another aspect, the object can be subjected to a high pressure and/or high temperature cycle such as is practised in high pressure mineralogy research laboratories by using an autoclave, a hydraulic press, a multi-anvil press, a pressure exerting diamond anvil cell and radiating oven, heating by laser, heating by joule effect for exerting temperature.

In the general context of the invention, the solid object obtained by the method of the invention can be reinforced by a frame consisting of a trellis made of metal or synthetic fibres (optic, carbon), or textile or plant fibres, incorporated into the body of the paste while it is liquid. Also a specific marker (magnetic, electronic, radioactive, . . . ) can be incorporated into the object by being added to the liquid paste.

Also odorous substances (organic or other) can be included in the paste in order to give an olfactory quality to the solid inorganic object obtained by the method of the invention.

Moreover, it has been shown according to the invention that with certain mixtures of compounds at step a) of the method, a migration of certain ions is observed, particularly alkaline ions, included in the aqueous inorganic paste, which makes it possible, when carrying out step e) of baking, to vitrify the surface of the inorganic material in a way that resembles enamel. This aspect of the invention method can advantageously be used to produce solid inorganic materials such as tiling, jewelry, decorative objects, bathroom items, etc.

In general, the method of the invention can be used for the production of solid mineral materials which can then be used for applications similar to the applications known for clay, ceramics, earthenware, glasses, enamels, plastics, adhesives, cements and coatings, stone and rock. However, it is also possible to design a solid inorganic object using the method of the present invention while reducing the object obtained in this way to a powder in order to use it as it is, for example as a dye or an inorganic agricultural fertiliser.

The invention also concerns a solid inorganic material obtained by the method as defined above, characterised in that it has the following general chemical formulation, as determined by scanning electronic microscope (SEM):

TABLE 1

| Element | Si | Al | Ca | Mg | Na | K | S | Zn | Fe | O |
|---|---|---|---|---|---|---|---|---|---|---|
| Atom % | 17.2 | 12.7 | 2.0 | 0.3 | 0.4 | 2.1 | 1.9 | 0.2 | 0.2 | 63.0 |

The invention also concerns a solid inorganic material obtained by the method as defined above, characterised in that it has the following general chemical formulation, as determined by scanning electronic microscope (SEM):

TABLE 2

| Element | Si | Al | Ca | Mg | Na | K | S | Zn | Fe | O |
|---|---|---|---|---|---|---|---|---|---|---|
| Atom % | 19.6 | 6.5 | 2.0 | 0.7 | 4.4 | 4.2 | 1.3 | 0.5 | 0.8 | 60.0 |

As already mentioned previously in the present specification, in certain embodiments of the method for producing a solid inorganic material according to the invention, first the formulations a) and b), provided respectively at steps a1) and a2) of the method, are mixed, in order to obtain a basic formulation which can be used for the following part of the method. In a second stage, the basic formulation above is mixed with formulation c) provided at step a3) of the method, in order to obtain the aqueous inorganic paste which is used to carry out the next steps of the methods.

Thus, for the practical implementation of the method for producing a solid inorganic material according to the invention, those skilled in the art can prepare in advance a basic formulation, consisting of a mixture of formulations provided at steps a1) and a2) of the said method, said basic formulation being able to be stored for a long period of time before use.

In this particular embodiment of the invention method, step a) is then carried out completely by mixing the basic formulation defined above with the formulation provided in step a3). Then the following steps of the method are carried out, as indicated above.

The basic formulation, resulting from the mixture of formulations a) and b) can be stored for several months at ambient temperature. If necessary, after a storage time of several months, the basic formulation can be rehydrated by adding water before use.

The present invention also concerns a basic formulation for producing a solid inorganic material, consisting of a mixture of the formulations a) and b) as follows:
- a) a paste formulation obtained by reaction of (i) a powder of one or more materials comprising a compound or a combination of compounds of silicon present in the form of anhydrous silica ($SiO_2$) or hydrated silica ($Si(OH)_4$), with (ii) an inorganic base or a combination of inorganic bases, optionally with (iii) water added;
- b) a formulation selected from among:
  - b1) a formulation consisting of a compound or a combination of compounds selected from among (i) sulphuric acid, (ii) a sulphuric acid salt selected from among alkaline sulphates, alkaline earth sulphates, metal sulphates or mixed sulphates, (iii) an organic acid and (iv) an organic acid salt; or
  - b2) a liquid or paste formulation obtained by mixing:
    a compound or a combination of compounds selected from among (i) sulphuric acid, (ii) a sulphuric acid salt selected from among alkaline sulphates, alkaline earth sulphates, metal sulphates or mixed sulphates, (iii) an organic acid and (iv) an organic acid salt;
    at least one mineral or organic base; and
    if necessary, water.

The present invention also concerns a method for preparing a basic formulation for producing a solid inorganic material, said method comprising the following steps:
- a) a paste formulation obtained by reaction of (i) a powder of one or more materials comprising a compound or a combination of compounds of silicon present in the form of anhydrous silica ($SiO_2$) or hydrated silica ($Si(OH)_4$) is provided, with (ii) an inorganic base or a combination of inorganic bases, optionally with (iii) water added;
- b) one of the following steps b-1 or b-2 are carried out:
  - b-1) a formulation is provided consisting of a compound or a combination of compounds selected from among (i) sulphuric acid, (ii) a sulphuric acid salt selected from among alkaline sulphates, alkaline earth sulphates, metal sulphates or mixed sulphates, (iii) an organic acid and (iv) an organic acid salt; or
  - b-2) a liquid or paste formulation is provided by mixing:
    a compound or a combination of compounds selected from among (i) sulphuric acid, (ii) a sulphuric acid salt selected from among alkaline sulphates, alkaline earth sulphates, metal sulphates or mixed sulphates, (iii) an organic acid and (iv) an organic acid salt;
    at least one mineral or organic base; and
    if necessary, water;
- c) the said basic formulation is obtained by mixing the formulation provided at step a) with the formulation provided at step b).

The present invention is also illustrated by the following examples.

EXAMPLES

In the following examples, the reagents are used with a fine particle size obtained for example by manual or mechanical grinding. However some reagents can exhibit a particle size measuring millimetres (argillaceous slate, granite sand, lava . . . ).

Example 1

The following are mixed:
100 g of gaize
35 g of caustic soda NaOH
35 g of water $H_2O$ in order to obtain a viscous paste consisting of silica dissolved in an alkaline medium.

The following are mixed elsewhere:
1.2 g of gypsum $CaSO_4\ 2H_2O$
0.3 g of caustic soda NaOH
0.5 g of water $H_2O$ To which 4.2 g of the first mixture is added.

Finally, the following is added:
2.8 g of gibbsite $Al(OH)_3$
3.2 g of cristoballite $SiO_2$
1.5 g of water $H_2O$ The mixture of these salts and minerals contains silicon, aluminium and calcium. It is placed in an open mould (in contact with air) then maintained at 30° C. for 48 hours before being unmoulded.

Example 2

The following are mixed:
100 g of gaize
50 g of potassium hydroxide KOH
35 g of water $H_2O$ in order to obtain a viscous paste consisting of silica dissolved in an alkaline medium.

The following are mixed elsewhere:
2.4 g of gypsum $CaSO_4\ 2H_2O$
0.9 g of potassium hydroxide KOH
0.8 g of water $H_2O$ To which 4.6 g of the first mixture is added.

Finally, the following is added:
6 g of metakaolin $2SiO_2Al_2O_3$
0.2 g of zinc oxide ZnO
1.3 g of water $H_2O$ The mixture of these salts and minerals contains silicon, aluminium and calcium. It is placed in an open mould (in contact with air) then maintained at 30° C. for 48 hours before being unmoulded. The chemical analysis by scanning electronic microscope (SEM) of the binder obtained is globally that represented in Table 1 below.

TABLE 1

| Element | Si | Al | Ca | Mg | Na | K | S | Zn | Fe | O |
|---|---|---|---|---|---|---|---|---|---|---|
| Atom % | 17.2 | 12.7 | 2.0 | 0.3 | 0.4 | 2.1 | 1.9 | 0.2 | 0.2 | 63.0 |

Example 3

The following are mixed:
25 g of diatomite
25 g of potassium hydroxide KOH
25 g of glauconite
20 g of water $H_2O$ in order to obtain a viscous paste consisting of silica dissolved in an alkaline medium.
The following are mixed elsewhere:
1.1 g of gypsum $CaSO_4\ 2H_2O$
0.4 g of potassium hydroxide KOH
0.6 g of water $H_2O$ To which 4.5 g of the first mixture is added.
Finally, the following is added:
3 g of sodium feldspar $NaSi_3AlO_8$
3 g of potassium feldspar $KSi_3AlO_8$
1.7 g of water $H_2O$ The mixture of these salts and minerals contains silicon, aluminium and calcium. It is placed in an open mould (in contact with air) then maintained at 35° C. for 48 hours before being unmoulded.

Example 4

The following are mixed:
100 g of gaize
50 g of potassium hydroxide KOH
35 g of water $H_2O$ in order to obtain a viscous paste consisting of silica dissolved in an alkaline medium,
4.6 g of this mixture is taken and the following is added:
0.9 g of gypsum $CaSO_4 2H_2O$
0.3 g of fluoroapatite $Ca_5(PO_4)_3(OH,F,Cl)$
6 g of metakaolin $2SiO_2Al_2O_3$
1 g of dolomite $(Ca,Mg)CO_3$
0.3 g of acetic acid
0.2 g of zinc oxide ZnO
2 g of water $H_2O$ The mixture of these salts and minerals contains silicon, aluminium, calcium and magnesium. It is placed in an open mould (in contact with air) then maintained at 35° C. for 48 hours before being unmoulded.

Example 5

The following are mixed:
50 g of gypsum $CaSO_4\ 2H_2O$
50 g of potassium hydroxide KOH
50 g of water $H_2O$
2.0 g of this mixture is taken and the following is added:
6 g of an industrial liquid alkaline silicate (0.23 $Na_2O$— 0.77 $SiO_2$, $nH_2O$)
6 g of metakaolin $2SiO_2Al_2O_3$
2 g of water $H_2O$ The mixture of these salts and minerals contains silicon, aluminium and calcium. It is placed in an open mould (in contact with air) then maintained at 30° C. for 48 hours before being unmoulded.

Example 6

The following are mixed:
100 g of gaize
50 g of potassium hydroxide KOH
35 g of water $H_2O$ in order to obtain a viscous paste consisting of silica dissolved in an alkaline medium.
The following are mixed elsewhere:
1.2 g of gypsum $CaSO_4\ 2H_2O$
0.4 g of caustic soda NaOH
0.5 g of water $H_2O$ To which 4.6 g of the first mixture is added.
Finally, the following is added:
6 g of trachyandesite lava
0.2 g of zinc oxide ZnO
2 g of water $H_2O$ The mixture of these salts and minerals contains silicon, aluminium and calcium. It is placed in an open mould (in contact with air) then maintained at 35° C. for 48 hours before being unmoulded.

The chemical analysis by scanning electronic microscope (SEM) of the binder obtained after hardening of the mixture is globally that represented in Table 2 below.

TABLE 2

| Element | Si | Al | Ca | Mg | Na | K | S | Zn | Fe | O |
|---|---|---|---|---|---|---|---|---|---|---|
| Atom % | 19.6 | 6.5 | 2.0 | 0.7 | 4.4 | 4.2 | 1.3 | 0.5 | 0.8 | 60.0 |

Example 7

The following are mixed:
100 g of gaize
50 g of potassium hydroxide KOH
35 g of caustic soda NaOH
55 g of water $H_2O$ in order to obtain a viscous paste consisting of silica dissolved in an alkaline medium.
The following are mixed elsewhere:
1.5 g of sulphuric acid $H_2SO_4$ (diluted to 32%)
0.5 g of fluoroapatite $Ca_5(PO_4)_3(OH,F,Cl)$
6.0 g of trachyandesite lava
1.0 g of dolomite $(Ca,Mg)CO_3$
0.2 g of zinc oxide ZnO
1.0 g of water $H_2O$ To which 6.0 g of the first mixture is added.
The mixture of these salts and minerals contains silicon, aluminium and calcium and magnesium. It is placed in an open mould (in contact with air) then maintained at 35° C. for 96 hours before being unmoulded.
The object is then subjected to thermal treatment at 815° C. in an oven in which the air vents have been left open.

Example 8

The following are mixed:
100 g of gaize
35 g of caustic soda NaOH
35 g of water $H_2O$ in order to obtain a viscous paste consisting of silica dissolved in an alkaline medium.
4.6 g of this mixture is taken and the following is added:
1.0 g of gypsum $CaSO_4\ 2H_2O$
0.5 g of potassium bitartrate $C_4H_5O_6K$
0.2 g of saltpetre $KNO_3$
0.2 g of salt NaCl
6 g of kaolin $2SiO_2Al_2O_3\ 2H_2O$
20 g of limestone $CaCO_3$
5 g of water $H_2O$

Example 9

The following are mixed:
100 g of gaize
25 g of potassium hydroxide KOH
17 g of caustic soda NaOH
35 g of water $H_2O$ in order to obtain a viscous paste consisting of silica dissolved in an alkaline medium.

The following are mixed elsewhere:
1.2 g of gypsum $CaSO_4$ $2H_2O$
0.4 g of potassium hydroxide KOH
0.5 g of water $H_2O$ To which 4.4 g of the first mixture is added.

Finally, the following is added:
2 g of nepheline syenite $2SiO_2Al_2O_3(NaK)O$
2 g of argillaceous slate
6 g of granite sand
2 g of sand $SiO_2$
2.6 g of water $H_2O$ The mixture of these salts and minerals contains silicon, aluminium and calcium and magnesium. It is placed in a closed mould (without contact with air) then maintained at 40° C. for 96 hours before being unmoulded. The object is then subjected to thermal treatment at 905° C. in an oven in which the air vents have been left open.

Example 10

The following are mixed:
100 g of diatomite
50 g of caustic soda NaOH
35 g of water $H_2O$ in order to obtain a viscous paste consisting of silica dissolved in an alkaline medium.

0.6 g of this mixture is taken and the following is added:
0.4 g of potassium bitartrate $C_4H_5O_6K$
0.6 g of sodium carbonate $Na_2CO_3$
0.7 g of nepheline syenite $2SiO_2Al_2O_3(NaK)O$
0.8 g of wollastonite $CaSiO_3$
0.2 g of copper carbonate $CuCO_3$
15 g of sand $SiO_2$
3.5 g of water $H_2O$ The mixture of these salts and minerals contains silicon, aluminium and calcium. It is placed in an open mould (in contact with air) then maintained at 30° C. for 72 hours before being unmoulded.

The object is then subjected to thermal treatment at 835° C. in an oven in which the air vents have been left open. It comes out covered with a turquoise blue coloured enamel.

Oxides or minerals rich in Mn, Cr, Fe . . . can be used in addition to or in the place of chrysocolla in order to change the colour of the enamel obtained.

Example 11

The following are mixed:
100 g of gaize
50 g of potassium hydroxide KOH
35 g of water $H_2O$ in order to obtain a viscous paste consisting of silica dissolved in an alkaline medium.

A second mixture is prepared elsewhere consisting of:
0.3 g of gold Au (18 carats)
0.8 g of nitric acid $HNO_3$ (concentrated at 22%)
1 g of hydrochloric acid HCl (concentrated at 30%)
0.7 g of water $H_2O$ which makes it possible to dissolve the gold (dissolving in nitrohydrochloric acid) and obtain its salts in liquid form.

0.6 g of the first mixture is taken and the following is added:
0.5 g of potassium bitartrate $C_4H_5O_6K$
1.1 g of natron $Na_2CO_3$
0.6 g of nepheline syenite $2SiO_2Al_2O_3(NaK)O$
3 g of wollastonite $CaSiO_3$
5 g of sand $SiO_2$
1 g of water $H_2O$ Then the gold salts dissolved in nitrohydrochloric acid are added.

The mixture of these salts and minerals contains silicon, aluminium and calcium. It is placed in an open mould (in contact with air) then maintained at 30° C. for 48 h before being unmoulded.

The object is then subjected to thermal treatment at 865° C. in an oven with the air vents closed. It comes out with a surface partially covered with gold.

The invention claimed is:

1. A method for producing a solid mineral material comprising the following steps:
   a) producing an aqueous paste according to the following steps:
      a1) providing a paste formulation obtained by reaction of
         (i) a powder of one or more materials comprising a compound or a combination of compounds of silicon selected from the group consisting of:
            the silicon compounds present in the form of anhydrous silica selected from the group consisting of amorphous silicate, quartz, trymidite, cristoballite, stishovite and anhydrous silica extracted from a plant and
            the silicon compounds present in the form of hydrated silica selected from the group consisting of diatomite, radiolarite, opal, gaize, flint, millstone grit, jasper; agate, chert, lutecite, quartzine, petrified wood and chalcedony, with
         (ii) an inorganic base or a combination of inorganic bases, optionally with
         (iii) water;
      a2) providing a formulation consisting of an organic acid salt or a combination of organic acid salts, the organic acid salt(s) being selected from the group consisting of alkylcarboxylic acid salts having from 2 to 20 carbon atoms and arylcarboxylic acid salts having from 6 to 20 carbon atoms;
      a3) providing a formulation comprising an additional crystalline or amorphous mineral or a combination of crystalline or amorphous minerals, the crystalline or amorphous mineral(s) being selected from the group consisting of:
         Aluminosilicates;
         Aluminates;
         alkaline and alkaline earth carbonates;
         metallic carbonates;
         silicates composed of pure silica; and
         alkaline earth silicates such that the formulations provided in steps a1) to a3) comprise at least (i) silicon, in the form of anhydrous silica, or (ii) aluminium and (iii) calcium and/or magnesium, said formulation optionally comprising water;

a4) mixing the formulations from steps a1), a2) and a3); to produce the aqueous paste;

b) forming the aqueous paste obtained from step a) into shape; and c) hardening the aqueous paste shaped in step b) by drying at atmospheric pressure, and at a temperature of less than 99° C., until the solid inorganic material is obtained.

2. The method according to claim 1, wherein step c) of hardening is followed by a step of baking.

3. The method according to claim 2, wherein the baking step is carried out at a temperature of over 1500° C.

4. The method according to claim 1, wherein the quartz is selected from the group consisting of rock crystal, amethyst, rose quartz, smoky quartz, citrin quartz, milky quartz, prasiolite, aventurine, and fibrous quartz.

5. The method according to claim 1 wherein the material or materials containing a compound or combination of compounds of silicon of the anhydrous silica are selected from the group consisting of amorphous silicate, containing over 20% in moles of $SiO_2$, compared with the total number of moles of said silicate.

6. The method according to claim 1, wherein the aluminosilicates are selected from the group consisting of (i) natural clays and baked clays, (ii) feldspars, (iii) micas, (iv) volcanic glasses, (v) schists, (vi) zeolites, (vii) garnets, (viii) certain amphiboles, and (ix) feldsparoid.

7. The method according to claim 6, wherein the clays are selected from the group consisting of kaolinite $Al_2Si_2O_5(OH)_4$, illite $KAl_4[Si_7AlO_{20}](OH)_4$, smectite $(1/2\ Ca,Na)_{0.7}(Al_4[(Si,Al)_8O_{20}](OH)_4.nH_2O$, vermiculite $(Mg,Ca)_{0.6}Al_6[(SiAl)_8O_{20}](OH)_4.nH_2O$, metakaolin $2SiO_2.Al_2O_3$ and baked earth.

8. The method according to claim 6, wherein the feldspar are selected from the group consisting of feldspars $KAlSi_2O_8$ including orthoclase, microcline and sanidine, plagioclase feldspars including albite $NaAlSi_3O_8$ and anorthite $CaAl_2Si_2O_8$.

9. The method according to claim 6, wherein the feldsparoids are selected from the group consisting of nepheline $(Na_3,K)AlSiO_4$, kalsilite $SiAlO_4K$, cancrinite or vishnevite $(Na,Ca,K)_{6-8}[Si_6Al_6O_{24}][(SO_4,CO_3,Cl,OH]_{1-2}.nH_2O$, leucite $KAlSi_2O_6$, analcite $NaAlSi_2O_6.H_2O$, sodalite $Na_8Si_6Al_6O_{24}Cl_2$, hauinite $(Na, Ca)_{4-8}[Si_6Al_6O_{24}](SO_4)_{1-2}$, lazurite $(Na, Ca)_{4-8}[Si_6Al_6O_{24}](SO_4,S)$ and noseane $Na_8[Si_6Al_6O_{24}](SO_4)$.

10. The method according to claim 6, wherein the micas are selected from the group consisting of biotite $K(Fe,Mg)_3AlSi_3O_{10}(OH,F)_2$, muscovite $KAl_2(AlSi_3O_{10})(OH,F)_2$, bromomuscovite $KAl_2BSi_3O_{10}(OH,F)_2$, hydrobiotite $K(Mg,Fe)_9(Si,Al)_8O_{20}(OH)_4.nH_2O$, phlogopite $KMg_3(AlSi_3O_{10})(F,OH)_2$, lepidolite $KLi_2Al(OH,F)_2AlSi_3O_{10}$, zinnwaldite $KLiFeAl(OH,F)_2$, glauconite $(K, Ca, Na)_{1,6}(Fe, Al, Mg)_4Si_{7,8}Al_{0.7}O_{20}(OH)_4$ and paragonite $Na_2Al_4[Si_6Al_2O_{20}](OH)_4$.

11. The method according to claim 6, wherein the garnets are selected from the group consisting of almandine $Fe_3Al2(SiO_4)_2$, grossular garnet $Ca_3Al_2(SiO_4)_3$, pyrope garnet $Mg_3Al_2(SiO_4)_3$, and spessartine garnet $Mn_3Al_2(SiO_4)_3$.

12. The method according to claim 1 wherein, at the step a1) and/or at the step a3), the silica is an anhydrous silica extracted from a plant.

13. The method according to claim 12, wherein the plant is selected from the group consisting of horsetail known as *Equisetum arvense*, bracken, rice straw, reed, papyrus and cereal plants.

14. The method according to claim 1, wherein in step a1), the inorganic base is selected from the group consisting of a sodium hydroxide, a potassium hydroxide, a lithium hydroxide, sodium carbonate or sodium decahydrate, potassium carbonate and lithium carbonate.

15. The method according to claim 1, wherein in step a2), one or several mineral compounds selected from the group consisting of compounds comprising phosphate, nitrate, fluoride and chloride radicals are added.

16. The method according to claim 15, wherein the additional mineral compounds are selected from the group consisting of apatite, potassium nitrate, fluorspar and sodium chloride.

17. The method according to claim 1, wherein in step a2), a sulphuric acid salt is added.

18. The method according to claim 17, wherein the sulphuric acid salt consists of a gypsum.

19. The method according to claim 1, wherein the alkylcarboxylic acid salts and arylcarboxylic acid salts are selected from the group consisting of the salts of the following acids: acetic acid, benzoic acid, butanoic acid, chloroacetic acid, citric acid, formic acid, fumaric acid, glycolic acid, lactic acid, maleic acid, malic acid, malonic acid, mandelic acid, o-phthalic acid, oxalic acid, propanoic acid, pyruvic acid, salicylic acid, succinic acid, tartaric acid, trichloroacetic acid.

20. The A method according to claim 19, wherein the organic acid salt consists of potassium bitartrate.

21. The method according to claim 1, wherein, at step a3), the aluminate(s) are selected from the group consisting of gibbsite, alumina and diaspore.

22. The method according to claim 1, wherein at step a3), the alkaline or alkaline earth carbonate(s) are selected from the group consisting of calcite, dolomite, magnesite and natron.

23. The method according to claim 1, wherein at step a3) the metallic carbonate(s) are selected from the group consisting of malachite and rhodochrosite.

24. The method according to claim 1, wherein at step a3) the silicate(s) composed of pure silica are selected from the group consisting of quartz, cristoballite, trymidite, stishovite and amorphous silica.

25. The method according to claim 1, wherein at step a3) the alkaline earth silicate(s) are selected from the group consisting of talc, serpentine, asbestos, wollastonite, pyroxenes, and olivine.

26. The method according to claim 25, wherein the pyroxenes are selected from the group consisting of an orthopyroxene including enstatite, aegirine, pigeonite and ferrosilite, a clinopyroxene including diopside, augite, jadeite and a spodumene.

27. The method according to claim 1, wherein at step a) zinc oxide is added.

28. An aqueous inorganic paste for producing a solid inorganic material consisting of a mixture comprising:

a) a paste formulation obtained by reaction of
(i) a powder of one or more materials comprising a compound or a combination of compounds of silicon selected from the group consisting of:
the silicon compounds present under the form of anhydrous silica selected from the group consisting of quartz, trymidite, cristoballite, stishovite and anhydrous silica extracted from a plant and the silicon compounds present under the form of hydrated silica selected from the group consisting of diatomite, radiolarite, opal, gaize, flint, millstone grit, jasper, agate, chert, lutecite, chalcedonite, quartzine, petrified wood and chalcedony, with (ii) an inorganic base or a combination of inorganic bases, optionally with (iii) water;

b) a formulation consisting of a compound or a combination of compounds selected from the group consisting of alkylcarboxylic acid salts having from 2 to 20 carbon atoms and arylcarboxylic acid salts having from 6 to 20 carbon atoms; and c) a formulation comprising an additional mineral or combination of minerals, crystalline or amorphous, selected from the group consisting of:
alumininosilicates;
aluminates;
alkaline and alkaline-earth carbonates;
metallic carbonates;
silicates composed of pure silica and
alkaline-earth silicates in such a way that the final inorganic paste comprises at least (i) silicon, (ii) aluminium and (iii) calcium and/or magnesium, said formulation optionally comprising water.

29. A basic formulation for producing a solid inorganic material, consisting of a mixture of the formulations a) and b) as follows:

a) a paste formulation obtained by reaction of (i) a powder of one or more materials comprising a compound of silicon or a combination of compounds of silicon selected from among:

the silicon compounds present in the form of anhydrous silica ($SiO_2$) selected from the group consisting of amorphous silicate, quartz, trymidite, cristoballite, stishovite and anhydrous silica extracted from a plant and the silicon compounds present in the form of hydrated silica selected from the group consisting of diatomite, radiolarite, gaize, flint, millstone grit, jasper, agate, chert, lutecite, quartzine, petrified wood, and materials comprising opal or chalcedony with (ii) an inorganic base or a combination of inorganic bases, optionally with (iii) water added;

b) a formulation consisting of a compound or a combination of compounds selected from the group consisting of alkylcarboxylic acid salts having from 2 to 20 carbon atoms and arylcarboxylic acid salts having from 6 to 20 carbon atoms.

30. A method for preparing a basic formulation for producing a solid inorganic material, said method comprising the following steps:

a) providing a paste formulation obtained by reaction of (i) a powder of one or more materials comprising a compound of silicon or a combination of compounds of silicon selected from the group consisting of:

the silicon compounds present in the form of anhydrous silica selected from the group consisting of amorphous silicate, quartz, trymidite, cristoballite, stishovite and anhydrous silica extracted from a plant and the silicon compounds present in the form of hydrated silica selected from the group consisting of diatomite, radiolarite, opal, gaize, flint, millstone grit, jasper, agate, chert, lutecite, quartzine, and petrified wood and chalcedony, and materials comprising opal or chalcedony with (ii) an inorganic base or a combination of inorganic bases, optionally with (iii) water;

b) providing a formulation consisting of a compound or a combination of compounds selected from the group consisting of alkylcarboxylic acid salts having from 2 to 20 carbon atoms and arylcarboxylic acid salts having from 6 to 20 carbon atoms; and c) mixing the formulation provided at step a) with the formulation provided at step b).

* * * * *